(12) United States Patent
Cumberland et al.

(10) Patent No.: US 8,834,739 B1
(45) Date of Patent: Sep. 16, 2014

(54) BORON NITRIDE NANO-PLATELETE BASED MATERIALS

(75) Inventors: Robert W. Cumberland, Malibu, CA (US); Christopher S. Roper, Santa Monica, CA (US); Adam Gross, Santa Monica, CA (US); Randall J. Moss, Thousand Oaks, CA (US); William Bernard Carter, Calabasas, CA (US)

(73) Assignee: The Boeing Company, Chicago, IL (US)

( * ) Notice: Subject to any disclaimer, the term of this patent is extended or adjusted under 35 U.S.C. 154(b) by 78 days.

(21) Appl. No.: 13/276,760

(22) Filed: Oct. 19, 2011

(51) Int. Cl.
*C09K 5/00* (2006.01)
(52) U.S. Cl.
USPC .................................. 252/73; 252/74; 252/75
(58) Field of Classification Search
None
See application file for complete search history.

(56) References Cited

U.S. PATENT DOCUMENTS

| | | | |
|---|---|---|---|
| 5,110,768 A | 5/1992 | Kaner et al. | |
| 5,137,959 A | 8/1992 | Block et al. | |
| 6,096,282 A | 8/2000 | Kaner et al. | |
| 6,951,583 B2 | 10/2005 | Clere et al. | |
| 7,341,702 B2 | 3/2008 | Pultz, Jr. et al. | |
| 7,445,797 B2 | 11/2008 | Meneghetti et al. | |
| 7,449,432 B2 | 11/2008 | Lockwood et al. | |
| 7,524,560 B2 * | 4/2009 | Paisner et al. | 428/403 |
| 7,527,859 B2 | 5/2009 | Zhong et al. | |
| 7,749,947 B2 | 7/2010 | Griffo et al. | |

OTHER PUBLICATIONS

Lin Rao and Richard B. Kaner; "Rapid Solid-State-Precursor Synthesis of Crystalline Boron Nitride"; Inorganic Chemistry, 1994, vol. 33, No. 15; pp. 3210-3211; American Chemical Society.

Edward G. Gillan and Richard B. Kaner; "Synthesis of Refractory Ceramics via Rapid Metathesis Reactions between Solid-State Precursors"; Chem. Matter., vol. 8, No. 2, 1996; pp. 333-343; American Chemical Society.

* cited by examiner

*Primary Examiner* — Necholus Ogden, Jr.
(74) *Attorney, Agent, or Firm* — Alston & Bird LLP

(57) ABSTRACT

The present invention is related to heat transfer materials including nano-scale boron nitride platelets having an aspect ratio ranging from about 10:1 to about 1000:1. The present invention also provides a method of removing heat from an object by directly or indirectly contacting the object with the heat transfer materials.

22 Claims, 3 Drawing Sheets

BORON NITRIDE NANO-PLATELETE BASED MATERIALS

FIELD OF THE INVENTION

The present invention is generally related to boron nitride materials and methods of removing heat from devices and/or systems using such materials.

BACKGROUND OF THE INVENTION

The thermal output of high speed microelectronics, radar systems, power electronics, and other electronic components generally needs to be removed from the device or system. For instance, the heat generated by these systems is typically removed by heat transfer systems employing a liquid phase which transports heat from the source to either an air-cooled heat sink/radiator or a refrigeration loop. Such thermal management systems increase the size and weight of mobile platforms (e.g., ground vehicles, aerospace platforms, and satellites). Accordingly, increasing the efficiency of these thermal management systems can potentially reduce the size and weight of a variety of mobile platforms.

Additionally, electronics designs and applications are frequently linked by the ability to dissipate ohmic heat generated during the operation of the electronics. Many electronic components (e.g., semiconductor components) are prone to breakdown at high temperatures. Thus, the ability to dissipate heat can be a limiting factor on the performance of several electronic components.

High thermal conductivity metal heat sinks, due to their high electrical conductivity, cannot be directly contacted with electronic components. Therefore, materials that are both thermally conductive and electrically insulating can play an important role in the efficient dissipation of heat from a variety of systems. For at least these reasons, there remains a need for heat transfer materials and methods with increasingly efficient thermal conductivity and electrical insulating properties.

BRIEF SUMMARY OF THE INVENTION

In one aspect, the present invention provides heat transfer fluids. Heat transfer fluids according to embodiments of the present invention can include nano-scale boron nitride platelets having an aspect ratio ranging from about 10:1 to about 1000:1. The boron nitride platelets are suspended in a carrier solvent or working fluid.

In another aspect, the present invention provides a method of removing heat from an object by directly or indirectly contacting the object with a heat transfer fluid comprising nano-scale boron nitride platelets having an aspect ratio ranging from about 10:1 to about 1000:1 suspended in a carrier solvent or working fluid.

In addition to heat transfer fluids, the present invention provides thermally conductive adhesive compositions. Such compositions can include boron nitride platelets formed from a metathesis reaction and having an aspect ratio from 10:1 to 1000:1. The boron nitride platelets can be dispersed or mixed within an adhesive. The thermally conductive compositions can be attached to a variety of surfaces and components to aid in the removal of heat therefrom.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

Figure 1:
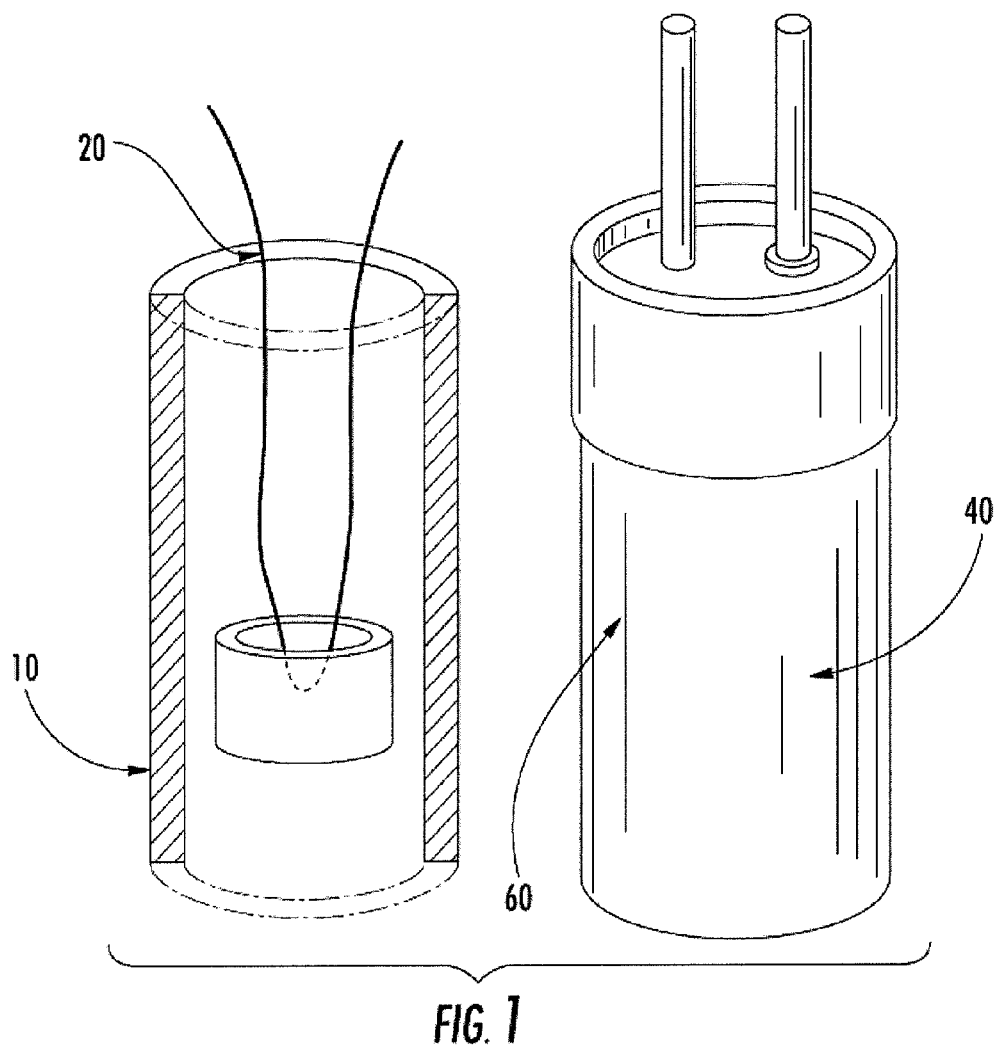
FIG. 1 is schematic of a reaction vessel used to initiate the boron nitride-forming reaction according to one embodiment of the present invention.

The present invention now will be described more fully hereinafter with reference to the accompanying drawings, in which some, but not all embodiments of the invention is shown. Indeed, this invention may be embodied in many different forms and should not be construed as limited to the embodiments set forth herein; rather, these embodiments are provided so that this disclosure will satisfy applicable legal requirements. Like numbers refer to like elements throughout. As used in the specification, and in the appended claims, the singular forms "a", "an", "the", include plural referents unless the context clearly dictates otherwise.

In one aspect, the present invention advantageously incorporates boron nitride nano-platelets, formed via a solid-state metathesis (double exchange) reaction, into materials of fluids to provide an increase in the material's thermal conductivity without increasing its electrical conductivity. This beneficial increase in thermal conductivity without increasing its electrical conductivity can be achieved, in accordance with certain embodiments of the present invention, by using large aspect ratio boron nitride platelets predominantly in the hexagonal crystalline form, which can offer exceptional thermal conductivity (~600 W/mK) and the potential to achieve a percolation threshold at a low loading density. Since hexagonal boron nitride is an electrical insulator, its incorporation into a material (e.g., heat transfer fluid, adhesive, etc.) will not risk introducing any appreciable degree of electrical conductivity.

In certain embodiments, crystalline boron nitride platelets in hexagonal form are achieved by a solid-state metathesis (double exchange) reaction. More specifically, boron nitride platelets can be formed according to general reactions (1a) and (1b):

$$MBX_4 + M_3N \rightarrow 4MX + BN \quad (1a);$$

$$BX_3 + M3N \rightarrow 3MX + BN \quad (1b);$$

in which M can be selected independently from any alkali or alkali earth metal (e.g., lithium, sodium, calcium, etc.) and X can be selected from any halide (e.g., fluoride, schloride, bromide, and iodide). In certain embodiments, boron nitride platelets can be formed according to the reaction (2):

$$LiBF_4 + Li_3N \rightarrow 4LiF + BN \quad (2).$$

This reaction is carried out by intimately mixing (e.g., grinding) the reactants in powder form to provide a powdered mixture of the two reactants. The resulting mixture in powder form can be heated, struck, or contacted by a resistively heated wire (e.g., nichrome or tungsten wire) to initiate the reaction. Upon initiation, the reaction self-propagates to completion. Beneficially, these reactions can be competed in a matter of seconds or minutes instead of hours or days as is customary in typical solid state reactions that rely on solid-solid diffusion to create products, or solid-gas reactions which also take significantly more time than mere seconds or minutes.

The resulting products can be washed to remove the MX by-product. In certain embodiments of the present invention, the products are washed with acid, preferably hydrochloric acid, to aid in dissolution of the MX by-product. This particular washing step with hydrochloric acid, for example, enables the industrial-scale production of boron nitride platelets without the generation of undesirably large quantities of aqueous waste. Although a water/HCl mixture can be used to wash the reaction products, if desired the reaction products can be washed with copious amounts of water, or with smaller amounts of $H_2SO_4$ or $HNO_3$ solutions. These washing steps are utilized to remove (dissolve) the MX by-product without affecting the solid boron nitride product.

Due to the aggressive rate of these reactions, they are more safely carried out in a reactor such as a steel calorimeter-like vessel 10 as illustrated in FIG. 1. The left side of FIG. 1 is a cut-away view of the reactor 10. After the reactants are mixed/ground together, they are placed into a stainless steel cup inside the reactor. The reaction is initiated via exposure to a resistively heated wire 20. The right side of FIG. 1 illustrates the outside of the reactor 10 in which one of the posts connected to the wire is shielded with an electrically insulating Teflon® sleeve 40 to prevent the current from shorting through the lid of the reactor. Due to the exothermic nature of these reactions, the reactor is preferably sealed shut with a threaded lock ring 60, as shown in FIG. 1, prior to initiation of the reaction. U.S. Pat. No. 5,110,768 (hereby incorporated in its entirety by reference) discloses reactor designs suitable for initiating the reactions according to embodiments of the present invention.

Figure 2:
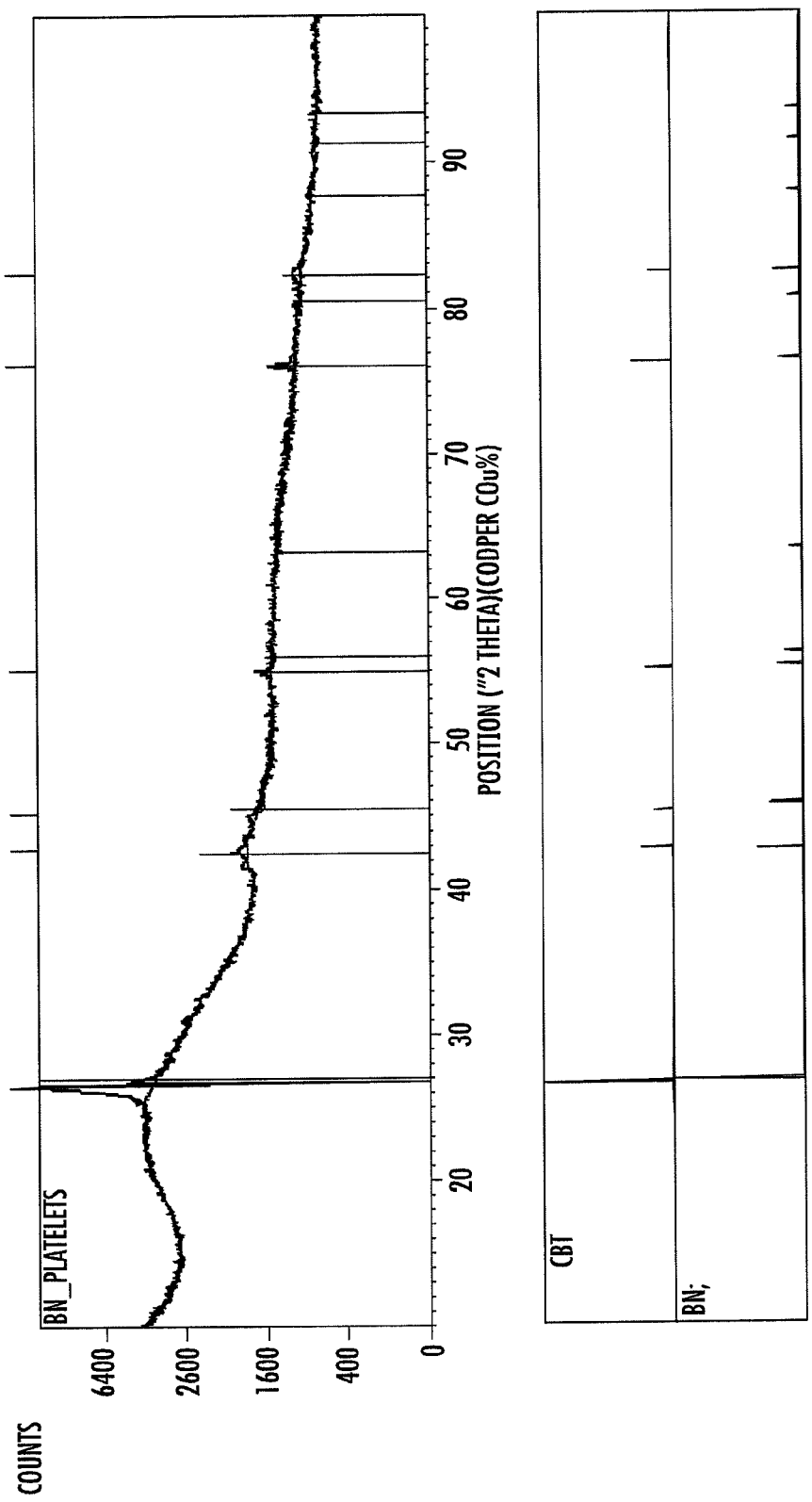
FIG. 2 is an X-ray diffraction spectrum of boron nitride platelets showing the presence of hexagonal phase boron nitride according to one embodiment of the present invention.

FIG. 2 is an X-ray diffraction spectrum (XRD) of boron nitride platelets produced according to one embodiment of the present invention. The XRD spectrum, for this particular embodiment, shows the presence of only hexagonal phase boron nitride. "hBN" indicates hexagonal boron nitride in FIG. 2. Although preferred embodiments utilize only hexagonal phase boron nitride, in certain embodiments a mixture of hexagonal phase and rhomboheral phase boron nitride can be utilized.

Figure 3:
FIG. 3 is a Scanning Electron Microscopy image of boron nitride platelets formed according to one embodiment of the present invention.
Figure 4:
FIG. 4 is a Transmission Electron Microscopy image of a side-on view of a single boron nitride platelet in which the individual lattice planes are visible and are spaced approximately about 3.3 Angstroms apart according to one embodiment of the present invention.

FIG. 3 is a Scanning Electron Microscopy (SEM) image of boron nitride platelets formed according to one embodiment of the present invention. This particular image shows the general size and shape of boron nitride platelets produced according to certain embodiments of the present invention. FIG. 4 is a Transmission Electron Microscopy (TEM) image of a side-on view of a single boron nitride platelet in which the individual lattice planes are visible and are spaced approximately about 3.3 Angstroms apart according to certain embodiments of the present invention.

In certain embodiments, the process for forming boron nitride platelets can be manipulated to produce boron nitride platelets of a predetermined size and/or aspect ratio. That is, if boron nitride platelets are to be used in a particular end-use or application in which a particular range of aspect ratios and/or size (e.g., range of nanometers) is more desirable, then the process can be altered to account for this need. In this respect, certain embodiments of the present invention provide a size "tunable" process. In particular, size and/or aspect ratio of the boron nitride product can be controlled by altering the temperature and/or time profile of the reaction as it propagates to completion. Since smaller scale reactions tend to heat and cool off more quickly, the boron nitride platelets have less time to grow and the resulting platelets are generally smaller and exhibit smaller aspect ratios. As such, one way to alter the process to produce larger platelets is by increasing the size or scale of the reaction so that the amount of time for boron nitride crystal growth is increased. Alternatively or in addition to increasing the scale of the reaction, an increased reaction temperature (e.g., insulation of the reactor for example to prevent the escape of heat) also increases the size and/or aspect rations of the resulting boron nitride platelets. If smaller platelets were desired, then the process could be altered by running smaller scale reactions and/or actually removing heat from the reaction system to lower the reaction temperature (so long as the heat removal does not stop the reaction). Reaction temperatures can also be controlled by pre-heating or pre-cooling the reactants prior to the initiation of the reaction.

Boron nitride platelets, in accordance with certain embodiments of the present invention, can be surface modified to facilitate their incorporation into a particular material (e.g., fluid or adhesive). For instance the incorporation of the boron nitride platelets into carrier materials can be facilitated by placing or depositing certain chemical groups or functionality onto the surface of the platelets. Beneficially, the amount of boron nitride platelets that can be loaded into a carrier material (fluid or adhesive) can be increased when the surface of the platelets are chemically modified to be compatible with the particular carrier fluid.

A variety of chemical groups bearing an array of functional groups can be chemically bonded or physicabsorbed to the surface of the boron nitride platelets. The term "physicabsorbed" as used herein defines a physical attachment to a surface through physical interactions without a chemical bond. For instance, an array of functional groups can be weakly attached (e.g., relative to covalent bonding to the surface of the platelets) to the surface of the boron nitride platelets through Van der Waals forces and/or dispersion forces such that the attachment is not covalently bonded to the boron nitride platelets. Exemplary chemical groups include, but are not necessarily limited to, amines, amino terminated polyethylene glycols, silanes, alkoxysilanes, chlorosilanes, thiols, organosilicon compounds, siloxanes, metal oxides, carboxylic acid derivatives, organo alkoxy aluminum compounds organo alkoxy zirconium compounds, and organo alkoxy titanium compounds. By way of example, surface modification can be carried out by mixing the boron nitride platelets in a 1-5 wt % solution of a chlorosilane or methoxysilane and stirring for approximately 10 minutes followed by decanting the excess solvent and heating the material for approximately 10 minutes at 150° C. One possible silane is (3-aminopropyl)dimethylmethoxysilane.

Alternatively, techniques such as atomic layer deposition or physical layer deposition can be used to deposit metals or metal oxides on the surface of the boron nitride platelets. Possible metals and metal oxides include, but are not necessarily limited to, aluminum, aluminum oxide, titanium, titanium oxide, zinc, and zinc oxide.

The high speed and exothermic nature of the reaction generally "roughens" the outer surface and edges (jagged in nature) of the resulting boron nitride platelets. This roughening of the surface increases the surface area of the platelets and increases its ability to interact with a surrounding material (e.g., fluid or adhesive). This increased interaction can contribute to a higher overall thermal conductivity and higher maximum loading parentages (amount or mass of platelets within our throughout the carrier material). In certain embodiments, the boron nitride platelets produced according to embodiments of the present invention have a surface area that is approximately 3-20% (e.g., 3-15%, 3-10%, 5-10%, or 10-20%) greater than milled boron nitride, which is generally smooth in nature.

In one aspect, the present invention provides a heat transfer fluid loaded with suspended platelets of nano-scale boron nitride platelets. These fluids, in accordance with embodiments of the present invention, can be suitable for use in a large variety of applications for the removal of heat from electronic components and heat exchange devices/systems. In certain embodiments, the heat transfer fluid consists of boron nitride nano-scale platelets suspended in a solvent or working fluid, while other embodiments can include other components. In certain embodiments, the present invention provides heat transfer fluids in the form of nano-fluids that can include nano-scale boron nitride platelets having an aspect ratio for width over thickness ranging from about 5:1 to about 1000:1 (e.g., 5:1 to 700:1, 5:1 to 500:1, 5:1 to 200:1, 5:1 to 100:1, 40:1 to 100:1, 100:1 to 450:1, 400:1 to 1000:1, 600:1 to 1000:1). That is, the aspect ratio can be determined by dividing the longest width of the platelet by the thickness of the platelet. To clarify, for example, the boron nitride platelets exist as layered structures stacked in the "z" direction and the platelets extend in the x,y plane as irregular (convex) polygon or distorted elliptical shape. The aspect ratio of a given platelet can be obtained by taking the longest chord available in the x,y direction and dividing it by the thickness in the z direction. For instance, in certain embodiments the boron nitride platelets can have average lengths and widths between 1-50 microns (e.g., 1-25, 1-20, 1-10, and 5-20 microns) and thicknesses ranging from 25 to 250 nm (e.g., 50-150 and 50-100 nm). In certain embodiments, the nano-fluid can be prepared in concentrate that is later diluted before use (in a heat exchanger for example).

Nano-fluids according to embodiments of the present invention are loaded with boron nitride platelets (plate-like particles) to create a thermally conductive, electrically insulating, lubricating heat transfer fluid suitable for use in a wide variety of heat transfer devices and systems. In certain preferred embodiments, the loaded boron nitride platelets have a large aspect ratio which, at least in part, helps improve the thermal performance of the boron nitride-based heat transfer fluid. For instance, increasing the aspect ratio of the boron nitride filler platelets, at a given loading fraction, increases the thermal conductivity of the heat transfer fluid/suspension.

Unlike other abrasive thermally conductive nano-fluids, embodiments according to the present invention utilize boron nitride platelets, which are generally self-lubricating. Accordingly, embodiments of the present invention help prevent wear on moving parts such as pumps, gears, fans, and turbines as well as pump seals (and the like). As opposed to electrically conductive metal-based nano-fluids, the insulating properties of the boron nitride-based fluids according to embodiments of the present invention allow for use in direct cooling of a variety of electronic devices. Furthermore, the large aspect ratio of the nano-platelet boron nitride particles produced and utilized according to embodiments of the present invention provide for improved thermal conductivity per loading percentage, thereby exhibiting an increase thermal performance. For instance, as the density and/or aspect ratios of the boron nitride platelets are increased, their ability to bridge or contact with each other increases the overall thermal conductivity of the nano-fluids according to embodiments of the present invention.

In certain preferred embodiments, the boron nitride platelets have at least partially been surface modified to include a particularly suitable functionality in view of the carrier solvent or working fluid. For instance, one or more surfaces of the boron nitride platelets can be modified to help maintain the suspension of boron nitride platelets in the solvent, as well as to increase the thermal conductivity of the fluid. Although not exhaustive, the surfaces of the boron nitride platelets, according to certain embodiments, can be functionalized with amines, thiols, or other groups which promote interaction with the solvent or working fluid, particularly polar solvents such as water. These functionalities can be attached with a variety of post synthesis chemical treatments such as high temperature exposure to flowing $NH_3$ (for amine attachment).

In certain preferred embodiments the solvent or working fluid in which the boron nitride platelets are suspended is a dielectric fluid, preferably hydrogenated poly-alpha-olefins, although many other fluids including both dielectric fluids and electrically conduction fluids can, if desired, be utilized according to a variety of embodiments of the present invention. Examples of suitable carrier solvents or working fluids include, but are not necessarily limited to, silicate ester, oils, mineral oils, hydrocarbons, polychlorinated biphenyls, freons, fluorocarbons, hydrofluorocarbons, chlorofluorocarbons, hydrochlorofluorocarbons, silicones, water, ammonia, ethylene glycol, diethylene glycol, glycine betaine, propylene glycol, polyalkylene glycol, other glycols, brines, kerosene jet fuel, gasoline, diesel fuel, biphenyl, biphenyl oxide, aryl ethers, alkylated aromatics, diphenylethane, hydrogenated terphenyls, dibenzyl toluene, alkyl benzenes, and liquid carbon dioxide. In certain embodiments, the solvent can be liquefied gas such as liquid air, liquid nitrogen, liquid oxygen liquid helium, and liquid neon.

The solvent or working fluid can also be both homogenous mixtures of fluids (e.g., ethylene glycol-water mixture) and heterogeneous mixtures of fluids (e.g., water-mineral oil microemulsions). Heterogeneous mixtures can also include phase change material (PCM) additives to further enhance the heat capacity of the fluid. The PCM can either be one component in the microemulsion (e.g., as a paraffin or fatty acid) or encapsulated salt hydrates. In certain embodiments, it can be beneficial to adhere the PCM to the exterior or surface of the boron nitride platelets to simultaneously enhance the heat capacity and thermal conductivity of the fluid. In various other embodiments, the solvent or working fluid can be a supercritical fluid (e.g., supercritical carbon dioxide) or a molten salt or mixture of molten salts (e.g., LiF, NaCl, $NaBf_4$, $BeF_2$, NaF, KF, $MgCl_2$, RbF, $ZrF_4$, $RbBF_4$, $KBF_4$, RbCl, LiCl, $UF_4$, $ThF_4$, $PuF_3$). In certain embodiments, the solvent or working fluid can include an ionic liquid. As understood by one skilled in the art, ionic liquids are salts in which the ions are poorly coordinated, which results in these solvents being liquid below 120° C. At least one ion has a delocalized charge and one component is organic, which prevents the formation of a stable crystal lattice and makes them melt at low temperature (e.g., <120° C.). Generally, ionic liquids can be defined as compounds that are comprised entirely or almost entirely of ions and are liquids at temperatures of less than about 120° C.

In certain embodiments, the ionic liquids comprise organic cations can be created by derivatizing one or more compounds to include substituents, such as alkyl, alkenyl, alkynyl, alkoxy, alkenoxy, alkynoxy, a variety of aromatics, such as (substituted or unsubstituted) phenyl, (substituted or unsubstituted) benzyl, (substituted or unsubstituted) phenoxy, and (substituted or unsubstituted) benzoxy, and a variety of heterocyclic aromatics having one, two, or three heteroatoms in the ring portion thereof, said heterocyclics being substituted or unsubstituted. The derivatized compounds include, but are not limited to, imidazoles, pyrazoles, thiazoles, isothiazoles, azathiozoles, oxothiazoles, oxazines, oxazolines, oxazaboroles, dithiozoles, triazoles, delenozoles, oxaphospholes, pyrroles, boroles, furans, thiophenes, phospholes, pentazoles, indoles, indolines, oxazoles, isoxazoles, isotetrazoles, tetrazoles, benzofurans, dibenzofurans, benzothiophenes, dibenzothiophenes, thiadiazoles, pyridines, pyrimidines, pyrazines, pyridazines, piperazines, piperidines, morpholones, pyrans, annolines, phthalazines, quinazolines, guanidiniums, quinxalines, choline-based analogues, and combinations thereof. The basic cation structure can be singly or multiply substituted or unsubstituted.

The anionic portion of the ionic liquid can comprise an inorganic moiety, an organic moiety, or combinations thereof. In preferred embodiments, the anionic portion comprises one or more moieties selected from halogens, phosphates, alkylphosphates, alkenylphosphates, bis(trifluoromethylsulfonyl)imide (NTf2), BF4-, PF6-, AsF6-, NO3-, N(CN)2-, N(SO3CF3)2-, amino acids, substituted or unsubstituted carboranes, perchlorates, pseudohalogens such as thiocyanate and cyanate, metal chloride-based Lewis acids (e.g., zinc chlorides and aluminum chlorides), or C1-6 carboxylates. Pseudohalides are monovalent and have properties similar to those of halides (see, Schriver et al., Inorganic Chemistry, W. H. Freeman & Co., New York (1990) 406-407, which is incorporated herein by reference). Examples of pseudohalides useful according certain embodiments of the present invention include cyanides, thiocyanates, cyanates, fulminates, and azides. Exemplary carboxylates that contain 1-6 carbon atoms are formate, acetate, propionate, butyrate, hexanoate, maleate, fumarate, oxalate, lactate, pyruvate and the like. Of course, such list is not intended to be an exhaustive listing of all possible anionic moieties possible according to the invention. Rather, a variety of further anionic moieties are also envisioned and encompassed by the present invention. For example, the invention also encompasses ionic liquids based on alkyl imidazolium or choline chloride anol-aluminum chloride, zinc chloride, indium chloride, and the like. Moreover, various further Lewis acid inorganic salt mixtures may be used.

If a salt is used as the working fluid, however, the salt should be selected so as to not etch the boron nitride platelets. In the case of a molten salt fluid, heterogeneous mixtures can also be utilized that include immiscible low melting point ceramic inclusions that undergo phase transformation and increase the heat capacity of the fluid.

Although the weight percentage of boron nitride platelets can be varied, certain embodiments include a weight percent of the boron nitride platelets ranging from 0.01% to 10% by weight based on the weight of the heat transfer fluid. In certain embodiments, the weight percentage of boron nitride platelets can range from 0.01% to 5%, 0.01% to 1%, 0.01% to 0.5%, 0.01 to 0.2% by weight based on the weight of the heat transfer fluid.

Heat transfer fluids according to embodiments of the present invention can exhibit a thermal conductivity ranging from 1.1-10 times the thermal conductivity of the carrier solvent without the boron nitride platelets. In certain embodiments, the fluids according to embodiments of the present invention can exhibit a thermal conductivity ranging from 1.1-5.0 times, or 1.1-3.0 times, or 1.5-3.0 times the thermal conductivity of the carrier solvent without the boron nitride platelets.

Heat transfer fluids according to embodiments of the present invention provide numerous thermal advantages other non-boron nitride-based thermally conductive nano-fluids. For instance, one embodiment of the present invention provide for higher thermal conductivity, higher convective heat transfer per unit area at a fixed pumping power (when pumped through a fluid heat exchanger for example), and higher critical heat flux than non-boron nitride-based thermally conductive nano-fluids. These thermal advantages can translate to several system and platform advantages including lower pumping power requirements (requiring less fuel and engine power), the ability to use smaller and lighter weight pumps, the ability to use smaller and lighter weight heat transfer components (e.g., cold plates, heat sinks, heat exchangers), and the use of reduced volumes of heat transfer fluid (and therefore lighter weight).

Additionally, heat transfer fluids according to embodiments of the present invention beneficially exhibit dielectric (electrically insulating) properties which enable its use in direct contact with electrical devices. The dielectric properties of embodiments of the present invention beneficially allow for its use in systems where electrical components could suffer failure in the event of a coolant leak, or for systems designed around immersion cooling of electrical components (including 2-phase cooling). In other words, boron nitride's electrically insulating properties (bandgap 5.5 eV) allow it to be used in direct contact with live circuits, without the risk of shorting. Unlike the embodiments of the present invention, pure liquids that provide sufficient heat transfer (e.g., water) cannot be used in direct contact with electrical devices while conventional thermally conductive nano-fluids not based on boron nitride particulates simply lack the thermal performance realized by embodiments of the present invention.

In another aspect, the present invention provides a method of removing heat from an object (e.g., a heat source) by directly or indirectly contacting the object with a heat transfer fluid according to embodiments of the present invention. As discussed previously, heat transfer fluids in accordance to embodiments of the present invention can be used in a wide variety of cooling applications in which heat is effectively withdrawn from an electronic component, liquid fluid or gas.

In certain embodiments, the heat source (e.g., electronic device) can simply be immersed in a heat transfer fluid according to embodiments of the present invention. In certain preferred embodiments, an electronic device or system is directly contacted with a heat transfer fluid according to embodiments of the present invention. Additionally or alternatively, the heat transfer fluid can be continuously passed, either indirectly or directly, across or through the object by forced convection. For example, the heat transfer fluid can be pumped over/around an object capable of emitting heat or through the tubes, shell, or plates of any heat exchanger. In certain embodiments, the object contacted, either directly or indirectly, comprises a heat transfer device or system. Heat transfer devices or systems can include, but not necessarily limited to, two-fluid heat exchangers, heat sinks, cold plates, single-phase liquid pumped fluid loops, microchannel cooling, immersion cooling, refrigeration loops, and two-phase cooling.

In yet another aspect, the present invention provides compositions including boron nitride platelets in accordance with embodiments of the present invention as a thermal filler. By utilizing boron nitride platelets, the thermal conductivity of a variety of compositions/materials (such as adhesives) can be increased without introducing the risk of electrical conductivity. In certain embodiments, the compositions can include an adhesive material preferably including a binder having boron nitride platelets dispersed or mixed within the adhesive material. Such compositions can be classified as thermal adhesives that can be used to bond heat generating devices (such as high speed IC's) to cooling systems or radiators (heat sinks). The use of such compositions can be particularly desirable in satellite on-board microelectronics, airborne radar systems, and microwave communication systems.

Boron nitride platelets can be used directly as thermal filler in a variety of materials (including adhesives) or one or more of the surfaces of the boron nitride platelets can be modified as discussed previously. That is, a variety of chemical groups bearing an array of functional groups can be chemically bonded or physicabsorbed to the surface of the boron nitride platelets. For instance, in some embodiments at least a portion of at least one surface of the boron nitride platelets is modified to include one or more of the following chemical groups: amines, amino terminated polyethylene glycols, silanes, chlorosilanes, organosilicon compounds, siloxanes, metal oxides, carboxylic acid derivatives, organo alkoxy aluminum compounds organo alkoxy zirconium compounds, organo alkoxy titanium compounds. For example, plasma treatment with ammonia can be used to add amine functionality to the surface of the boron nitride platelets. Alternatively, techniques such as atomic layer deposition or physical layer deposition can be used to deposit metals or metal oxides on the surface of the boron nitride platelets. Possible metals and metal oxides include, but are not necessarily limited to, aluminum, aluminum oxide, titanium, titanium oxide, zinc, and zinc oxide.

In certain compositions according to embodiments of the present invention, the boron nitride platelets utilized according to embodiments of the present invention have a surface area that is approximately 3-20% (e.g., 3-15%, 3-10%, 5-10%, or 10-20%) greater than milled boron nitride, which is generally smooth in nature.

In certain embodiments, the present invention provides compositions, such as thermally conductive adhesives, that can include nano-scale boron nitride platelets having an aspect ratio for width over thickness ranging from about 5:1 to about 1000:1 (e.g., 5:1 to 700:1, 5:1 to 500:1, 5:1 to 200:1, 5:1 to 100:1, 40:1 to 100:1, 100:1 to 450:1, 400:1 to 1000:1, 600:1 to 1000:1). That is, the aspect ratio can be determined by dividing the longest width of the platelet by the thickness of the platelet. To clarify, for example, the boron nitride platelets exist as layered structures stacked in the "z" direction and the platelets extend in the x,y plane as irregular (convex) polygon or distorted elliptical shape. The aspect ratio of a given platelet can be obtained by taking the longest chord available in the x,y direction and dividing it by the thickness in the z direction. For instance, in certain embodiments the boron nitride platelets can have average lengths and widths between 1-50 microns (e.g., 1-25, 1-20, 1-10, and 5-20 microns) and thicknesses ranging from 25 to 250 nm (e.g., 50-150 and 50-100 nm).

Boron nitride platelets can be incorporated into essentially any elastomeric binder material. In certain preferred embodiments, the boron nitride platelets are incorporated into epoxies, polyurethanes, acrylics, silicones, or combinations thereof. Once the boron nitride platelets have been prepared, they can be mixed into, for example, a thermally conductive adhesive. Such adhesives typically contain a binder that imparts structural integrity to the adhesive and provides the adhesive force to attach surfaces and/or components. As referenced above, generally any adhesive material can be used and, in certain embodiments, the binder is selected from epoxies, polyurethanes, acrylics, silicones, or combinations thereof. The boron nitride platelets (surface modified or not) can be mixed into the adhesive using milling, impaction techniques, or high shear mixing. In certain embodiments, the binder material is preferably a polyurethane or a polyurethane modified epoxy (e.g. a flexible epoxy).

The weight percent of the boron nitride platelets incorporated into compositions according to embodiments of the present invention can vary, but can range from 1% to 50% by weight based on the weight of the composition. In certain embodiments according to the present invention, compositions (e.g., thermally conductive adhesives) include a weight percent of the boron nitride platelets ranging from 5% to 50% (10% to 40%, 20% to 40%, 20% to 35%, or 20% to 30%) by weight based on the weight of the composition.

In certain embodiments, the compositions including boron nitride platelets incorporated as thermal filler can exhibit a thermal conductivities at ambient temperature and in vacuum ($10e^{-6}$ Torr) environments ranging from 0.1 to 3 W/mK, 0.2 to 3 W/mK, 0.2 to 2 W/mK, 0.2 to 1 W/mK, 1 to 3 W/mK, 1.5 to 3 W/mK, 1.5 to 2 W/mK, or 2 to 3 W/mK.

In particular embodiments, the boron nitride platelets can be surface modified in a manner to facilitate their incorporation into the elastomeric binder or adhesive material. The incorporation of boron nitride platelets can be improved and/or increased by placing chemical groups onto the surface of the platelets that will be wet by the particular elastomeric binder being utilized in the preparation, for example, of a thermal adhesive. In certain embodiments, the selective modification of the platelet surfaces enables an increased amount of boron nitride platelets to be incorporated into materials. That is, the loading percentage of boron nitride platelets in various compositions can be increased due to the appropriate selection of surface modification in view of the particular binders or elastomers in the composition. Such compositions can exhibit higher overall thermal conductivity and loading percentages. In certain preferred embodiments, the boron nitride platelets are modified with amines because boron nitride and amines associate strongly and enable solubilization in liquids. By way of example, amine based surface modification (as previously discussed) works well the various epoxies.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A heat transfer fluid, comprising: nano-scale boron nitride platelets having roughened outer surfaces due to formation of said platelets via a solid-state metathesis reaction, said boron nitride platelets having an aspect ratio ranging from about 400:1 to about 1000:1 and being suspended in a carrier solvent.

2. The fluid of claim 1, wherein at least a portion of at least one surface of the boron nitride platelets is modified to include one or more of the following chemical groups: amines, amino terminated polyethylene glycols, silanes, alkoxysilanes, chlorosilanes, organosilicon compounds, siloxanes, metal oxides, carboxylic acid derivatives, organo alkoxy aluminum compounds organo alkoxy zirconium compounds, thiols, organo alkoxy titanium compounds.

3. The fluid of claim 2, wherein one or more of the chemical groups is chemically bonded to the surface of the boron nitride platelets.

4. The fluid of claim 2, wherein one or more of the chemical groups is physicabsorbed to the surface of the boron nitride platelets.

5. The fluid of claim 1, wherein the boron nitride platelets have an average width between 1-50 microns and an average thicknesses ranging from 25 to 250 nm.

6. The fluid of claim 1, wherein the carrier solvent includes one or more of the following fluids: silicate ester, oils, mineral oils, hydrocarbons, polychlorinated biphenyls, freons, fluorocarbons, hydrofluorocarbons, chlorofluorocarbons, hydrochlorocarbons, hydrochlorofluorocarbons, silicones water, ammonia, ethyleneglycol, diethylene glycol, glycine betaine, propylene glycol, polyalkylene glycol, glycols, brines, kerosene, jet fuel, gasoline, diesel fuel, biphenyl, biphenyl oxide, aryl ethers, alkylated aromatics, diphenylethane, hydrogenated terphenyls, dibenzyl toluene, alkyl benzenes, and liquid carbon dioxides.

7. The fluid of claim 1, wherein the weight percent of the boron nitride platelets ranges from 0.1% to 1% by weight based on the weight of the heat transfer fluid.

8. The fluid of claim 1, wherein the fluid exhibits a thermal conductivity ranging from 1.1-5.0 times the thermal conductivity of the carrier solvent without the boron nitride platelets.

9. The fluid of claim 1, wherein at a portion of the boron nitride platelets have a surface area that is from 3-10% greater than milled boron nitride.

10. The fluid of claim 1, wherein all of the boron nitride platelets are in the hexagonal phase.

11. A composition, comprising:
(a) an adhesive material including a binder; and
(b) boron nitride platelets having roughened outer surfaces due to formation of said platelets via a solid-state metathesis reaction, said boron nitride platelets having an aspect ratio from 400:1 to 1000:1; said boron nitride platelets are mixed within the adhesive.

12. The composition of claim 11, wherein at least a portion of at least one surface of the boron nitride platelets is modified to include one or more of the following chemical groups: amines, amino terminated polyethylene glycols, silanes, chlorosilanes, organosilicon compounds, siloxanes, metal oxides, carboxylic acid derivatives, organo alkoxy aluminum compounds organo alkoxy zirconium compounds, organo alkoxy titanium compounds.

13. The composition of claim 12, wherein one or more of the chemical groups is chemically bonded or physicabsorbed to the surface of the boron nitride platelets.

14. The composition of claim 11, wherein the boron nitride platelets have an average width between 1-50 microns and an average thicknesses ranging from 25 to 250 nm.

15. The composition of claim 11, wherein the binder includes epoxies, polyurethanes, acrylics, silicones, and combinations thereof.

16. The composition of claim 11, wherein the weight percent of the boron nitride platelets ranges from 1% to 50% by weight based on the weight of the composition.

17. The fluid of claim 1, wherein the carrier solvent comprises a dielectric fluid.

18. The fluid of claim 17, wherein the carrier solvent comprises a hydrogenated poly-alpha-olefin.

19. The fluid of claim 1, wherein the carrier solvent comprises a homogenous mixture of fluids.

20. The fluid of claim 19, wherein the homogenous mixture of fluids comprises an ethylene glycol-water mixture.

21. The fluid of claim 1, wherein the carrier solvent comprises a heterogeneous mixture of fluids.

22. The fluid of claim 21, wherein the heterogeneous mixture of fluids comprises a water-mineral oil mixture or an emulsion including a phase change material.

\* \* \* \* \*